United States Patent
Bellehumeur et al.

(12)

(10) Patent No.: US 6,948,723 B1
(45) Date of Patent: Sep. 27, 2005

(54) INLINE SKATE BRAKE

(75) Inventors: Alex R. Bellehumeur, 6242 Napoli Ct., Long Beach, CA (US) 90803; Drew A. Krah, Van Nuys, CA (US)

(73) Assignee: Alex R. Bellehumeur, Long Beach, CA (US)

( * ) Notice: Subject to any disclaimer, the term of this patent is extended or adjusted under 35 U.S.C. 154(b) by 0 days.

(21) Appl. No.: 10/766,600

(22) Filed: Jan. 27, 2004

Related U.S. Application Data

(60) Provisional application No. 60/443,265, filed on Jan. 27, 2003, provisional application No. 60/467,296, filed on May 5, 2003.

(51) Int. Cl.[7] ............................ A63C 13/14; B60T 1/00
(52) U.S. Cl. ...................................... 280/11.214; 188/48
(58) Field of Search ........................... 188/3, 4, 5, 1.12; 280/1.19, 1.231, 1.211, 1.216, 1.214, 1.33, 280/1.34, 1.207

(56) References Cited

U.S. PATENT DOCUMENTS

| | | | |
|---|---|---|---|
| 5,639,104 A | | 6/1997 | Haldemann ................. 280/112 |
| 5,836,590 A | * | 11/1998 | Mitchell et al. ........ 280/11.214 |
| 5,895,061 A | | 4/1999 | Gignoux .................... 280/11.2 |
| 5,938,213 A | | 8/1999 | Gignoux .................... 280/11.2 |
| 6,010,136 A | * | 1/2000 | Hoskin .................. 280/11.214 |
| 6,065,761 A | * | 5/2000 | Gignoux et al. ........ 280/11.214 |
| 6,598,887 B2 | * | 7/2003 | Haldemann ............ 280/11.221 |

* cited by examiner

*Primary Examiner*—Matthew C. Graham
(74) *Attorney, Agent, or Firm*—Edgar W. Averill, Jr.

(57) ABSTRACT

A brake assembly for inline skates. The brake assembly has a braking roller which is turned by one or more of the wheels of the inline skate when the roller is in a braking position. The braking roller then expands outwardly and causes its outer surface to rub against a braking surface causing a braking action. The braking roller may be carried by a pair of carrier plates movably positioned within the frame which holds the inline skate brake wheels.

15 Claims, 4 Drawing Sheets

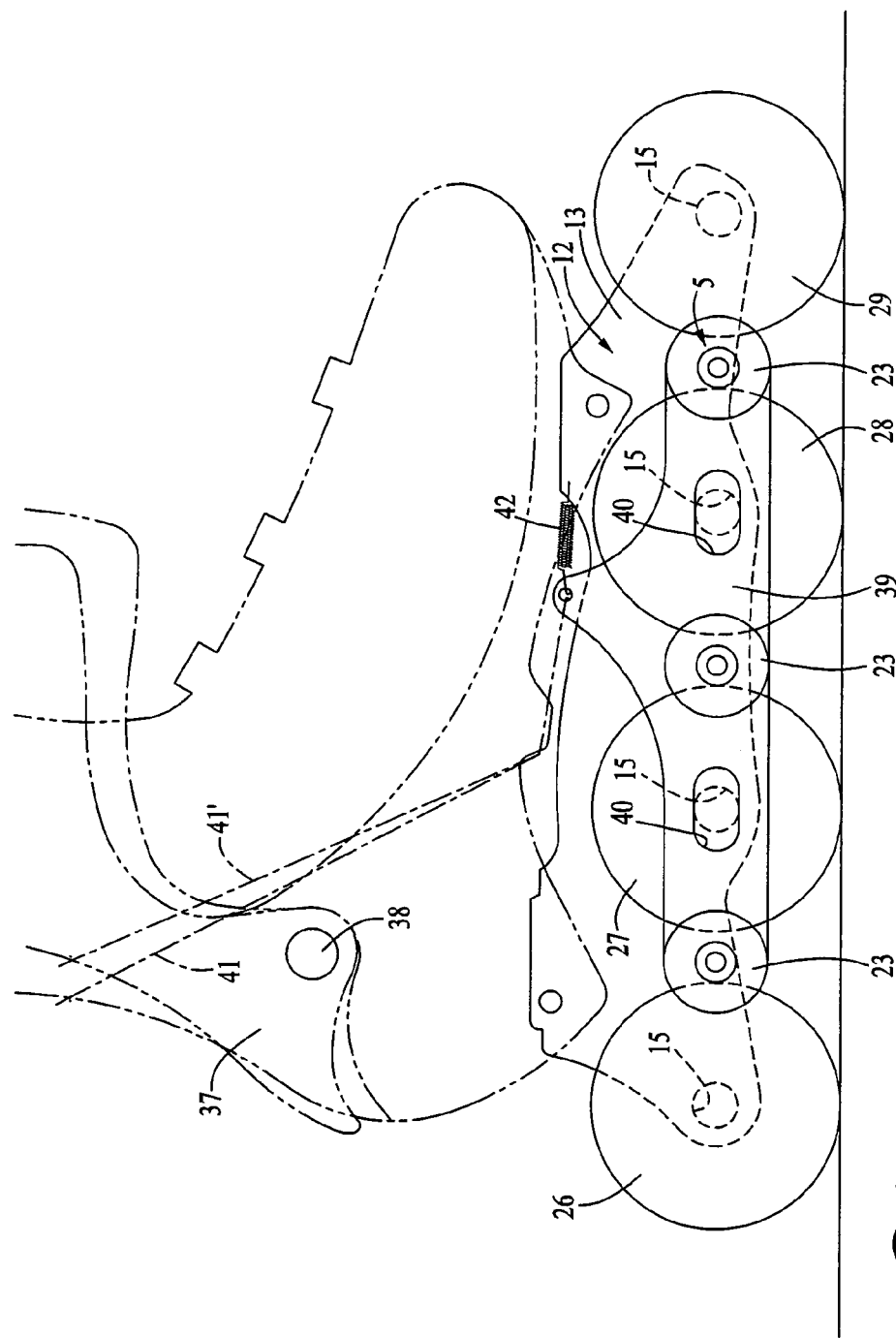

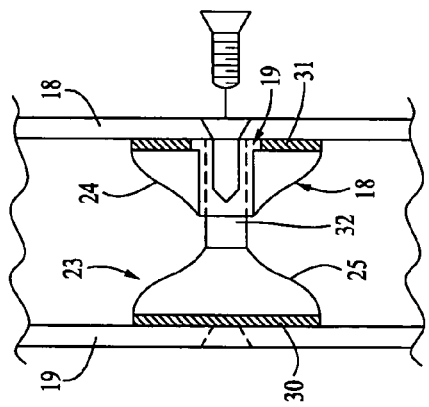
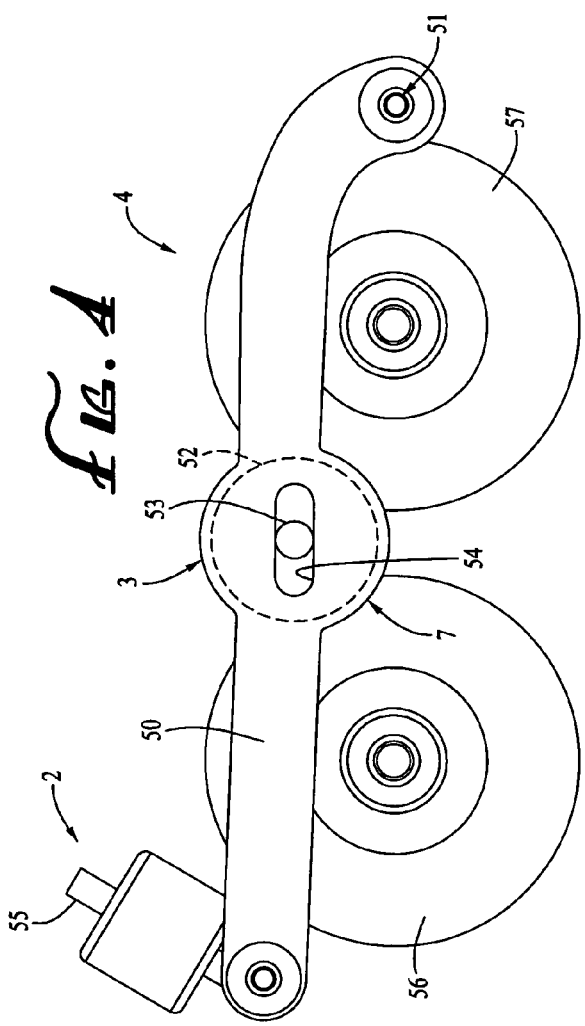
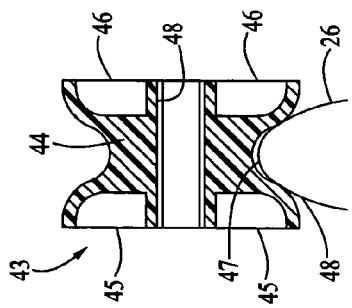
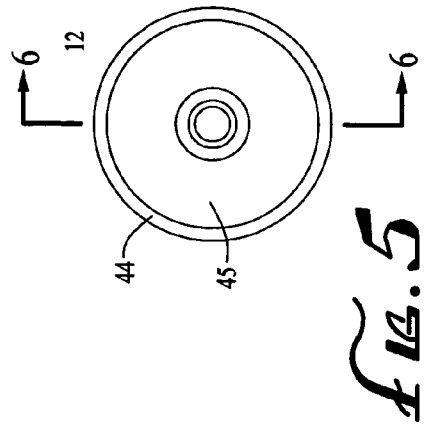

6,948,723 B1

INLINE SKATE BRAKE

CROSS-REFERENCE TO PRIOR APPLICATIONS

Provisional applications on the subject invention were filed on Jan. 27, 2003, assigned Ser. No. 60/443,265. and May 5, 2003, and assigned Ser. Nos. 60/467,296.

BACKGROUND OF THE INVENTION

The field of the invention is inline skate brakes and the invention relates more particularly to inline skate brakes of the type which use a "diabolo." The term "diabolo" is intended to mean a roller which has two halves and a center portion with a reduced diameter. A typical diabolo used on an inline skate is shown in FIG. 2 of U.S. Pat. No. 5,938,213. As the diabolo is brought into contact with a wheel or two wheels, the two halves of the diabolo, referred to in the '213 patent as disks, move outwardly so that their outer surface rubs against the chassis, causing a braking action.

Another diabolo is shown in U.S. Pat. No. 5,895,061 which refers to a brake having a pair of disks 9. The disks 9 have a frusto conical face facing the wheels 11 and diabolos are held away from the wheels by a spring 13. When the disks 9 come into contact with the wheel, they are moved apart and pressed against the arms of lever 11. U.S. Pat. No. 5,639,104 shows a skate brake which has a diabolo with frusto conical disks, shown for instance in FIGS. 2, 3, 4, and 5.

U.S. Pat. No. 6,065,761 shows a cylindrical braking wheel which contacts the outer surface of one or more of the wheels of an inline skate.

BRIEF SUMMARY OF THE INVENTION

The present invention is for a brake assembly for inline skates which have a frame supported by a boot portion. The frame has a right and left downwardly directed frame member. The frame holds at least three axles, and usually four, for supporting wheels. A preferred version of the brake assembly has a right and a left carrier plate positioned along a portion of the inner face of the downwardly directed frame members. Each downwardly directed frame member has an inwardly directed protrusion around each axle opening, which abuts the wheel bearing of each wheel and holds the wheel away from the frame. A right and a left carrier plate is positioned along a portion of the inner face of the frame. The carrier plate has elongated openings which are positioned over the bearing supporting protrusions of the frame. The carrier plate can move back and forth, up and down, or at an angle depending upon the shape of the elongated openings. The carrier plates hold a plurality of diabolos. The diabolos do not contact the wheels when the carrier plate is in a disengaged position and contact the wheels when the carrier plate is in an engaged position. Means are provided for movably controlling the position of the carrier plate, preferably by use of a collar around the ankle of the boot.

A preferred configuration of diabolo is a single diabolo having a curved recess, although two separated disks can be used. The preferred diabolo has an elastic portion so that when it contacts a wheel, it stretches outwardly and its outer faces contact the carrier plate to provide a braking action.

BRIEF DESCRIPTION OF THE SEVERAL VIEWS OF THE DRAWING

FIG. 3 is a side view of an inline skate having the skate brake of the present invention having horizontally oriented elongated openings.

FIG. 4 is a side view of two wheels having a diabolo held on a pair of pivoted levers therebetween.

FIG. 5 is a cross-sectional view of a diabolo useful with the present invention.

FIG. 6 is an end view of the diabolo of FIG. 5.

FIG. 7 is a side view of an alternate configuration of the diabolo useful with the brake of the present invention.

DETAILED DESCRIPTION OF THE INVENTION

Figure 1:
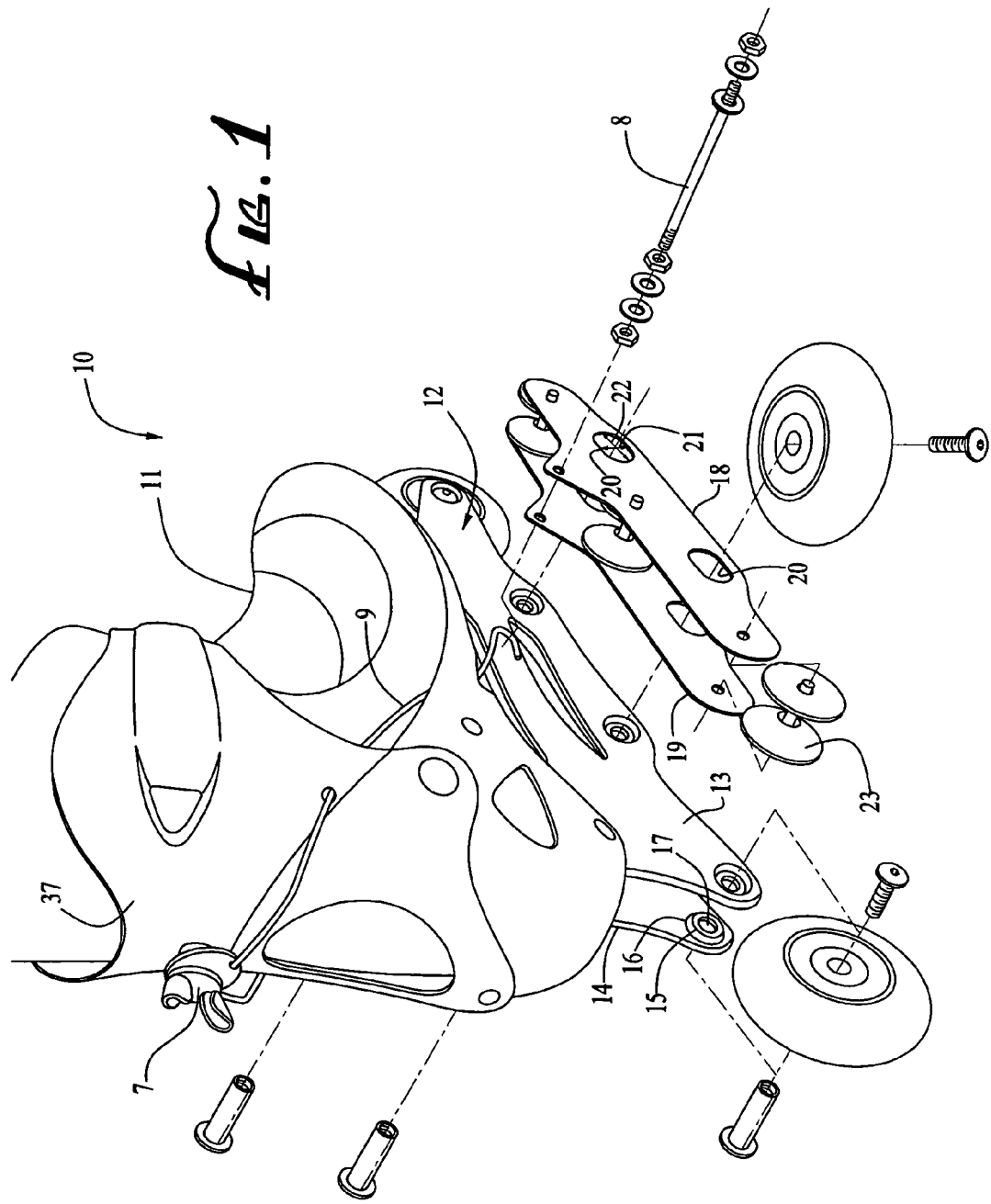
FIG. 1 is an exploded perspective view of the underside of an inline skate showing the frame of the skate and the pair of carrier plates. The carrier plates are shown as supporting a plurality of diabolos.

An inline skate is shown in perspective view in FIG. 1 and indicated generally by reference character 10. Inline skate 10 has a boot portion 11 with a frame 12 affixed to the bottom thereof. Frame 12 has a right downwardly directed frame member 13 and a left downwardly directed frame member 14. Each of the right and left frame members have four axle openings 17 for supporting wheel axles. Each axle opening has an inwardly directed bearing supporting protrusion 15. Each protrusion 15 has an outer dimension indicated by the arrow 16. Each axle opening is indicated by reference character 17.

A right carrier plate 18 and a left carrier plate 19 each have two elongated openings 20. Each elongated opening has a major dimension 22 and a minor dimension 21. The minor dimension 21 is about equal to the outer dimension 16 of protrusion 15. In this way, each carrier plate can slide along the elongated openings back and forth or up and down or at an angle while being guided by contact with the protrusions 15. A spoke 9 can function either as a tension member or as a force applying member. In FIG. 1, it functions in both forms since when collar 37 moves forward, spoke 9 pushes the carrier plates forward through bolt and nuts 8. The spoke 9 may be adjustable by turning wing nut 7 or other conventional adjustment means such as that shown in FIG. 4. It is contemplated that a TEFLON or other high slip polymer ring could be placed around the protrusions 15 to reduce friction and wear between the carrier plates and the protrusions. The carrier plates 18 and 19 are preferably steel having a thickness of only about 0.028. In this manner, they fit within a conventional frame and require very little change in design or appearance of the frame.

In one configuration diabolo 23 has a separate right half 24 and a left half 25. The face of the right and left halves 24 and 25 are preferably curved as shown in FIG. 7. The curved face has several important advantages. Firstly, it contacts a greater area of a wheel, such as wheel 26 shown in FIG. 2. Increased contact forces the halves 24 and 25 outwardly so that an outer portion 30 and 31 rubs against the carrier plates 18 and 19. Halves 24 and 25 are rotatingly supported by an axle 32 and are free to move in and out along axle 32, as well as to freely rotate thereon. (see FIG. 7) The axle may be shaped so that it can't turn with respect to the carrier plates 18 and 19. This can be accomplished by anti-rotational geometry wherein the bolt is recessed into a non-circular recess in the carrier plates. It can also be accomplished by screws or rivets.

Figure 2:
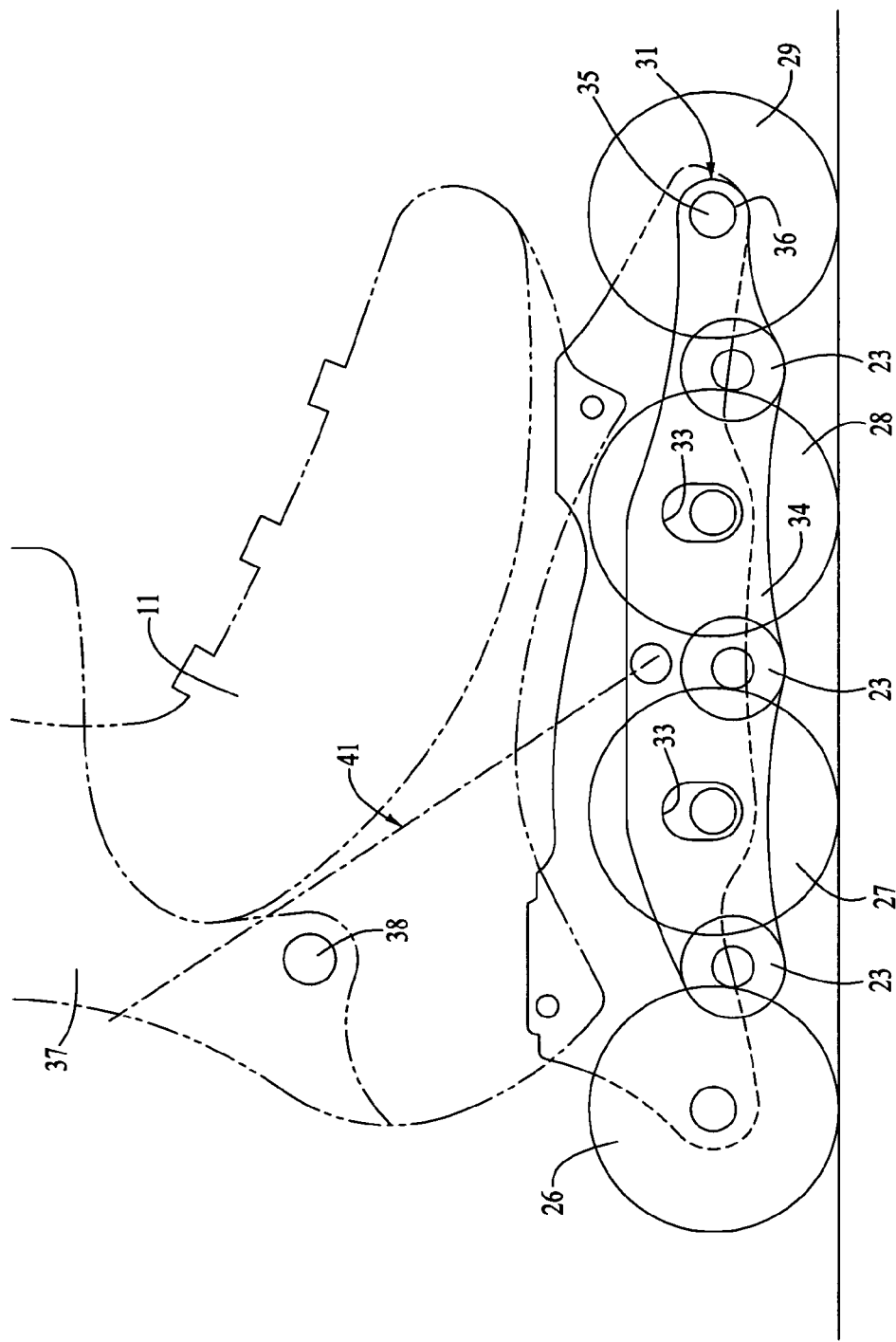
FIG. 2 is a side view of an inline skate having a skate brake of the present invention having vertically oriented openings.

Referring to FIG. 2, the carrier plate is a pivoted carrier plate 34 which is supported by a pivot 35, which is supported around protrusion 36. The elongated openings 33 are vertically oriented and the carrier plates are shown in an upward or braking configuration in FIG. 2. There is, of course, an identical carrier plate 34 on the other side of the inline skate of FIG. 2.

A tension member 41 may be a cable or spoke which is assigned to the back of a collar 37 which is pivotally supported by pivots 38 held by boot 11. As collar 37 moves back, tension member 41 lifts upwardly lifting carrier plates 34 pivotally upwardly so that diabolos 23 contact wheels 26, 27, and 28. When collar 37 is in its forward normal position, carrier plates 34 are lowered so that diabolos 23 do not contact wheels 26, 27, and 28. There is preferably no contact between a diabolo and front wheel 29. The tension member may be configured as a force applying member, such as a spoke, which would be configured to transmit a downward movement of the back of a collar to the carriers.

Turning now to FIG. 3, the carrier plates are indicated by reference character 39 and have horizontally aligned openings 40, which are likewise supported by protrusions 15. A cable is shown in a braking position 41 in FIG. 3 and in a normal riding position 41'.

When the collar 37 is in a braking position, the carrier plates 39 are moved rearwardly so that the diabolos 23 contact wheels 26, 27 and 28 and are spread apart in the manner indicated in FIG. 7. When collar 37 is in a non-braking position, a return spring 42 urges the carrier plates 39 forwardly so that they are free of contact with wheels 26, 27, and 28.

An especially preferred diabolo configuration is shown in FIGS. 5 and 6 where the diabolo is indicated by reference character 43. Diabolo 43 has a one piece elastomeric or polymeric body 44 which is flexible enough to be moved outwardly by contact with the wheel 26. As it moves outwardly, the frictional rings 45 and 46 abut the carrier plates 19 and 18, respectively. There is a further braking action caused by the curved shape of the diabolo. It is to be understood that the outer peripheral edge 47 of wheel 26 moves at a faster linear speed than a more inwardly positioned portion 48. Since the diameter of the wheel is much greater than the diameter of the diabolo, these relative speeds change so that there is a rubbing action caused by the mating of the wheel with the curved surface of the diabolo. This rubbing action provides additional braking force and the heat from this braking force is readily dissipated by the large surface of the wheel especially when the wheel is in contact with a skating surface cooler than itself. The result is a more efficient and less likely to overheat brake. A steel hollow cylindrical axle 48 reduces the rotational friction of diabolo 43 around an axle. The elastomeric or polymeric body may be fabricated from polyurethane, rubber, polytetrafluoro ethylene, polyetheretherketone, polyetheretherimide and phenolic based resins.

A braking assembly using a pair of levers 50 is shown in FIG. 4. A split carrier pivot 51 supports levers 50 with respect to the frame halves 13 and 14 not shown in FIG. 4, but analogous to that shown in FIG. 1. The elastomeric body may be fabricated from polyurethane or rubber. The curved shape of the inner portion of the diabolo may be elliptical, round, parabolic, hyperbolic, or poly curved.

A diabolo 52 shown in phantom view is supported by an axle 53 held in elongated opening 54. Levers 50 are moved up and down by the connection of rod 55 with a spoke or other rigid member attached to collar 37 in a manner known to those skilled in the art. As the collar is pivoted rearwardly, rod 55 moves downwardly forcing diabolo 52 against wheels 56 and 57. As shown by comparing FIGS. 2, 3, and 4, the diabolos may be above, at, or below the level of the axles of the wheels of the inline skate.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A brake assembly for inline skates having a boot portion, a frame supported below said boot portion, said frame having a right and a left downwardly directed frame members, each downwardly directed frame member having at least three sets of openings for supporting at least three axles, each axle supporting a wheel, and each opening having an inwardly directed bearing supporting protrusion extending inwardly from an inner face of each frame member and each inwardly directed bearing supporting protrusion having a peripheral edge, each frame member extending below said axles, said brake assembly comprising:

a right and a left carrier plate positioned along at least a portion of the inner face of said right and left downwardly directed frame members, each carrier plate having at least two elongated openings positioned over at least two bearing supporting protrusions so that said right and left carrier plates can move between an engaged position and a disengaged position, said elongated openings having a major dimension and a minor dimension and said minor dimension being about equal to an outer dimension of said protrusions;

a plurality of diabolos supported by said right and left carrier plates, each diabolo having a pair of wheel contacting portions, said plurality of diabolos being positioned so that they do not contact a wheel when said carrier plate is in a disengaged position and so that they contact a wheel when said carrier plates are in an engaged position; and means for moving said carrier plates between a disengaged position and an engaged position.

2. The brake assembly of claim 1 wherein said means for moving said carrier plates between a disengaged position and an engaged position comprises a collar pivotally held about an ankle portion of said boot, said collar having a force conveying member connected to said right and left carrier plates and adapted to move said carrier plates to a disengaged position when said collar is in a forward position and to move said carrier plates to an engaged position when said collar is in a rearward position.

3. The brake assembly of claim 1 wherein said elongated openings have said major dimension oriented horizontally and surround said respective peripheral edges of said protrusions over which they are positioned.

4. The brake assembly of claim 1 wherein said elongated openings have said major dimension oriented vertically and surround said respective peripheral edges of said protrusions over which they are positioned.

5. The brake assembly of claim 1 wherein said carrier plates are biased toward a disengaged position.

6. The brake assembly of claim 1 wherein said carrier plates are pivotally supported about a front wheel of said inline skate.

7. The brake assembly of claim 1 wherein each of said diabolos has an axis of rotation and said axis of rotation of at least one of said diabolos is positioned below an axis of rotation of all of said wheels.

8. The brake assembly of claim 1 wherein each of said diabolos comprise two members rotatably held over a diabolo axle supported by said carrier plates, each of said members having a tapered surface for contacting an outer surface of a wheel and the tapered surface having a wider portion at an outer side and a narrower portion at an inner side and each of said separate members having a friction inducing surface on an outer end of said separate members for contact with said carrier plates when said diabolo is moved into a braking position.

9. The brake assembly of claim 8 wherein said members are separated from one another in each diabolo.

10. The brake assembly of claim 8 wherein said members are integral and covered with a flexible polymer.

11. A brake assembly for inline skates having a boot portion, a frame supported below said boot portion, said frame having a right and a left downwardly directed frame members, each downwardly directed frame member having at least three sets of openings for supporting at least three axles, each axle supporting a wheel, said brake assembly comprising:
   a right and a left carrier plate positioned along at least a portion of the inner face of said right and left downwardly directed frame members and said right and left carrier plates are movably supported by said frame so that said right and left carrier plates can move between an engaged position and a disengaged position;
   at least one diabolo supported by said right and left carrier plates, said at least one diabolo having a pair of wheel contacting portions, said at least one diabolo being fabricated in a one piece body having a flexible radially outwardly facing portion having radially narrowed inner portion and an outer frictional portion and said at least one diabolo being configured so that the radially outwardly facing portion and said radially narrowed inner portion do not contact said wheel when said carrier plates are in a disengaged position and so that when said carrier plates are in an engaged position, said radially outwardly facing portion does contact said wheels and is urged outwardly so that said outer frictional portion is urged outwardly into contact with said carrier plates; and
   means for moving said carrier plates between a disengaged position and an engaged position.

12. The brake assembly of claim 11 wherein said at least one diabolo is held in a horizontally oriented slot in said pair of carrier plates and is oriented between two adjacent wheels and when moved vertically, contacts said two adjacent wheels.

13. The brake assembly of claim 11 wherein the body of said diabolo is fabricated from a polymeric material selected from the group consisting of polyurethane, rubber, polytetrafluoro ethylene, polyetheretherketone, polyetherimide and phenolic based resin.

14. The brake assembly of claim 11 wherein said diabolo has a cylindrical axle made of a rigid material.

15. The brake assembly of claim 11 wherein said at least one diabolo is supported by an axle held by said carrier plates in a manner so that the axle can not turn with respect to said carrier plates.

\* \* \* \* \*